United States Patent [19]
Chen et al.

[11] Patent Number: 5,340,619
[45] Date of Patent: Aug. 23, 1994

[54] METHOD OF MANUFACTURING A COLOR FILTER ARRAY

[75] Inventors: Yih-Wen Chen; Terry Brewer; Jeffery Hunninghake, all of Rolla; Dan Hawley, St. James, all of Mo.

[73] Assignee: Brewer Science, Inc., Rolla, Mo.

[21] Appl. No.: 138,701

[22] Filed: Oct. 18, 1993

[51] Int. Cl.$^5$ ............................................. B05D 3/06
[52] U.S. Cl. ................................. 424/498; 156/643;
427/165; 427/166; 427/255.6; 427/259;
427/266; 427/269; 427/272; 427/282; 427/287;
427/294; 427/296; 427/389.7; 427/393.5;
427/407.2; 427/496; 427/497; 427/500;
427/504; 427/508; 427/509; 427/511; 427/512;
427/514; 427/521; 427/535; 427/552; 427/555;
427/558; 427/559

[58] Field of Search ............... 156/643; 427/498, 165,
427/166, 255.6, 259, 266, 269, 272, 282, 287,
294, 296, 389.7, 393.5, 407.2, 496, 497, 500, 504,
508, 509, 511, 512, 514, 521, 535, 552, 555, 558,
559

*Primary Examiner*—Bernard Pianalto
*Attorney, Agent, or Firm*—Veo Peoples, Jr.

[57] ABSTRACT

Color filter arrays containing one or more colors for liquid crystal displays and other optoelectronic devices are made by using a laser to ablate portions of a coating on either a colored or transparent substrate. Color filter materials are placed into the ablated openings and cured. The number of laser ablated openings in the coated substrate varies, depending on the quantity and types of colors desired.

13 Claims, 3 Drawing Sheets

METHOD OF MANUFACTURING A COLOR FILTER ARRAY

BACKGROUND OF THE INVENTION

1. Field of the Invention

The present invention relates to a method for manufacturing a color filter array, particularly one used in flat panel color displays such as liquid crystal display devices, and other optoelectric devices.

2. Description of the Prior Art

Liquid crystal displays (LCD) and other flat panel display devices (FPD) are known for monochrome digital display in, for example, electronic calculators, clocks, household appliances, audio equipment, etc. There has been a need to introduce a color display capability into such monochrome display devices. The need arises particularly for applications such as peripheral terminals using various kinds of equipment involving phototube display, mounted electronic display, or TV-image display.

Although previous attempts have been made to introduce a color array into these devices, none of the color arrays for flat panel display devices so far proposed have been acceptable in meeting all the users needs. Materials and methods used to fabricate, for example, a red, green and blue (RGB) color filter array, for full color displays, in the past have included gelatin dyeing, dyed polyimide, pigmented polyimide and pigmented acrylates, applied by photolithographic printing and electrodeposition. However, these methods have low yields and throughput in high definition photolithographic application. Color filter materials add 32.2% to the cost of LCD production. Added to the expense of such materials is the fact that their shelf stability is not good.

In conventional gelatin dyeing a negative photolithographic imaging method is employed. The color display is made by photosensitizing a gelatin layer, exposing the layer to a pattern of light shining through a mask, developing the pattern, hardening the gelatin in the exposed areas, and washing to remove the unexposed gelatin. The pattern of gelatin thus produced is then colored by the first dye solution of the desired array. The pattern is then recoated with gelatin and the above steps are repeated for each additional color desired. This method contains many labor-intensive steps, requires careful alignment, separate protective coatings, and is time-consuming and unduly expensive. Further details of the gelatin dyeing process are exemplified in U.S. Pat. No. 4,081,227.

Another photolithographic method for making a color filter array is directed to dying polyimides as disclosed in U.S. Pat. No. 4,876,165. The method includes making the color filter array by positive-imaging photolithography. This technique deals with a positive photoresist patterning process where the exposed region, rather than the re-exposed region, is washed away leaving a pattern produced from raised lines rather than by negative recesses. The use of soluble dyes, dissolved in the polyimide, produces a homogeneous coating. This homogeneous coating enhances color uniformity. The polyimide matrix provides high thermal stability (to 230° C.), rendering the final color filter compatible with indium tin oxide (ITO) processes. A coplanar pixel display may be produced by patterning one level and then overcoating polyimide for patterning of the next level.

A similar dyed polyimide to make a color filter array is disclosed in U.S. Pat. No. 5,176,971 by use of photolithographic processes disclosed in U.S. Pat. No. 5,147,844, U.S. Pat. No. 5,166,125, and U.S. Pat. No. 5,166,126 and by thermally transferring the dyes.

In Japanese Pat. No. 8493679 pigmented polyimide color filter materials are employed. In a number of Japanese patents, e.g. JP04330405A, JP 9191260, JP 831216, JP 60129739, and JP 92037987, pigmented dispersions are used as the color filter materials. In these methods photolithographic processing is the typical technique for making color filter arrays.

Off-set printing has also been used in panel display manufacturing to make color filter arrays for low end application, but are of low quality. Non-photolithographic methods for making color filter arrays are, for example, electrodeposition and vacuum deposition. These methods are not as common in manufacturing color filter arrays.

Another method for non-photolithographic color filter array manufacture in a liquid crystal display device is described in EPA No. 246,334. This method employs a porous membrane to contain dyes which are transferred by heat under reduced pressure using a metal mask. The dyes are transferred from a donor layer, to a receiver layer through an air gap formed therein between. This technique yields insufficiently sharp images. The drawback is characteristic of dye receiver materials.

In photolithographic processes, a minimum of eight (8) steps per color layer is required. Therefore, it requires at least thirty-two steps to make a full color filter array which would include three RGB color layers plus a black matrix. The multiplicity of steps in photolithographic processing results in low yield and throughput. For example if there is a 95% yield for each step, the final yield is only 19% for a 32-step process. In order to obtain an 80% final yield, the yield must be greater than 99.3% in each step. The best final yield to date for photolithographic display processes has been approximately 50%.

The high number of process steps resulting in low throughput and excessive equipment and extra labor are not the only problem. Also, the chemicals involved in this process may pose environmental problems, stemming from hazardous waste by-products.

In addition, color filter arrays used for flat panel devices are required to undergo severe heating during treatment and processing. For example, a transparent electrode layer, such as indium tin oxide (ITO), is usually vacuum sputtered onto the color filter array at temperatures as high as 300° C., and over a period of one hour or more. This is followed by coating with a thin alignment layer. The surface of the alignment layer which contacts the liquid crystals may require rubbing or curing for several hours at an elevated temperature. Such treatment steps threaten the colored filter material of the array, especially those with a gelatin matrix.

The individual color regions or pixel regions created by the above methods range in size from 20 to 600 $\mu$m square.

Laser Ablation has been discussed in the prior art although not in the manufacturing of color filter arrays. U.S. Pat. No. 5,061,341 discloses a method of laser marking plastic articles. The method comprises a series of contrasting color plastic coatings. The laser ablates the upper layer enabling a message to be seen clearly. U.S. Pat. No. 4,624,736 discloses a method for using a laser to etch and deposit material on a substrate. The method uses a laser and a reactive gas near the substrate to modify the substrate. U.S. Pat. No. 4,877,644, discloses a method for treating a resist covered metal substrate so as to allow for easier removal of portions of the resist from the substrate surface. U.S. Pat. No. 4,478,677, discusses a method to etch glass to facilitate the mounting of high density circuit chips. The laser is used to excite the glass which in turn activates a gas that etches the glass substrate. U.S. Pat. No. 4,925,523, reveals a method to use two lasers to improve ultraviolet laser ablation. Finally, U.S. Pat. No. 5,170,191, is a method using laser ablation to shape an optical surface, specifically like soft contact lenses.

Laser ablation has been researched on a variety of polymers. Excimer lasers have been used to pattern polyvinylidene difluoride complex lines as narrow as 20 $\mu$m, see Gauthier, M. et all, "Excimer laser thin metallic film patterning on polyvinylidene difluoride". Photoetching of a number of polymeric materials including poly(methyl-methacrylate) (PMMA), poly vinylacetate (PVA), poly ($\alpha$-methyl styrene) (PS), poly (tetrafluoroethylene) (PTFE), polyproylene (PP), nitrocellulose, copolymer styrene allyl alcohol (SAA) and polymer-monomer mixture PVA plus 25 wt % biphenyl carbonitrile has been measured, see Liu, Y. et al, "Photoetching of Polymers with Excimer Lasers". This document included measurements of photoetch rates, analysis of optical absorption coefficients, and etch depth per pulse. Rates of photoetching were found to be dependent upon the optical absorption coefficient of polymeric materials and upon chemical structures of the polymer itself. Apparently exposed materials are modified by the initial laser pulses and then are etched away by continued exposure to the radiation. The etch rate (etched material per pulse) at a given exposure condition was thought to follow Beer's law. The basis of the technique is the well known process of ablative photo-decomposition which was first mentioned in the literature in 1982. When organic polymers are exposed to laser light with sufficient photon energy and photon flux, they can undergo a transition to the gas phases so suddenly that the thermal effect on the surrounding material is minimal. Both photochemical and photothermal mechanism are thought to be factors depending on the material and the process conditions, see Srinivasan, R. et al, "Ultraviolet laser ablation of polyimide films".

OBJECTS OF THE INVENTION

An object of the invention is to provide a novel method for producing a color filter array by use of laser ablation which avoids the drawbacks of the prior art.

Still another object of the present invention is to provide a novel method for manufacturing pixel sizes having a broader range of 5 to 1000 $\mu$m square.

Yet another object of the present invention is to provide a novel method for manufacturing a color filter array which requires significantly fewer steps than existing color filter array methods.

A final object is to provide a novel use for laser ablation.

Additionally, the method enables use of less dangerous, nontoxic chemicals as compared to production of color filter arrays in photolithographic processing.

Another object of the present invention is to provide a novel method for conforming the shape of the color filter arrays, made during printing, into well defined shapes with sharp edges and great uniformity even for high end application.

SUMMARY OF THE INVENTION

The present invention is directed toward a method for employing laser ablation to pattern color filter arrays without the need for photolithographic processing.

The method employs four fundamental steps, i.e. coating, curing, ablating a pattern, and filling the ablated patterns. The abating and filling steps are duplicated for each color desired in the filter array other than the initially coated color.

One preferred embodiment calls for spin coating of a black, light absorbing material onto the substrate. After curing, laser ablation removes pixel regions into which a color filter material is inserted. This material is cured and another region is ablated and a different color is inserted. Curing, ablation and the insertion of another color continues until the pattern and colors are complete.

Additional embodiments may be employed, if desired. For example, an adhesive promoter is optional and will provide for better adhesion between the color filter material and the substrate. Also, the thickness of the final array may be reduced by laser ablation.

Another embodiment permits the use of a variety of conventional printing techniques to assist in coating the substrate. The simultaneous coating of all the colors onto laser ablated substrates by use of a printing plate method. Allows multiple coloring in a single step.

Another embodiment permits using a release layer solution. After the initial coating and ablation, a release coating is placed over the substrate. Next, the substrate is coated by a color filter material and then an opening ablated for application of the next color. Ablation and color addition continues until the pattern desired is created. After developing and washing of the release layer, only the color filter material in the ablated regions remain. The laser ablation or plasma etching may be employed to reduce the thickness of the final array.

Still another embodiment would allow the use of a mask in conjunction with the laser ablation step. A mask containing some regions which absorb or reflect the laser's energy and other regions which allow passage of the energy, can be placed between the laser and the target substrate. The use of mask would enables a single laser to ablate multiple regions simultaneously.

BRIEF DESCRIPTION OF THE DRAWINGS

FIG. 1A is a sectional view after the first coating step of the preferred embodiment of the present invention.

FIG. 1B is a sectional view after the second step ablated the pixel region of the preferred embodiment of the present invention.

FIG. 1C is a sectional view after the third step filling of the pixel region with a colored filter material.

FIG. 1D is a sectional view after a repetition of the step two ablation needed for a second color application.

FIG. 1E is a sectional view after the pixel region is filled with a second color filter material.

FIG. 1F is a sectional view showing the completed cycle after an additional color is inserted for a full color filter array according to the preferred embodiment of the present invention.

FIG. 2A is a sectional view showing the placement of the three colors on to the substrate by printing plates.

FIG. 2B is a sectional view showing the curing of the colors.

FIG. 2C is a sectional view after laser ablation of the overlap material.

FIG. 2D is a sectional view after coating with a black, light absorbing matrix material.

FIG. 2E is a sectional view after curing of the black, light-absorbing matrix.

FIG. 2F is a sectional view after overcoating a clear polymer material.

FIG. 2G is a sectional view after curing of the clear polymer coating.

FIG. 2H is a sectional view after either laser ablation or plasma etching to reduce the thickness of the color filter array.

FIG. 3A is a sectional view after coating and curing a black filter material onto a substrate.

FIG. 3B is a sectional view after the black filter material is ablated.

FIG. 3C is a sectional view after addition of a release layer.

FIG. 3D is a sectional view after the addition of a blue color filter material.

FIG. 3E is a sectional view after ablation of the array to make openings for the next color filter material.

FIG. 3F is a sectional view showing the remaining blue color filter material after developing the release layer and baking the color filter array.

DETAILED DESCRIPTION AND PREFERRED EMBODIMENTS OF THE INVENTION

Turning now to the drawings, FIGS. 1A–1F show sectional views of the steps in manufacturing a four color filter array according to a preferred embodiment of the present method. The present disclosure is not intended to limit the broad aspects of the invention to the embodiments illustrated and is to be considered as an exemplification of the principles of the method.

Figure 1A:
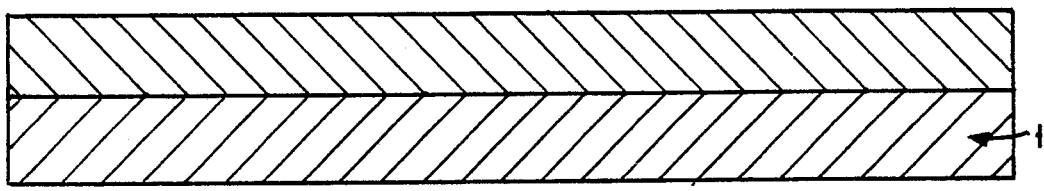
FIGS. 1A–1F are sectional views showing the collection of steps in the preferred embodiment of the present invention.
Figure 1B:
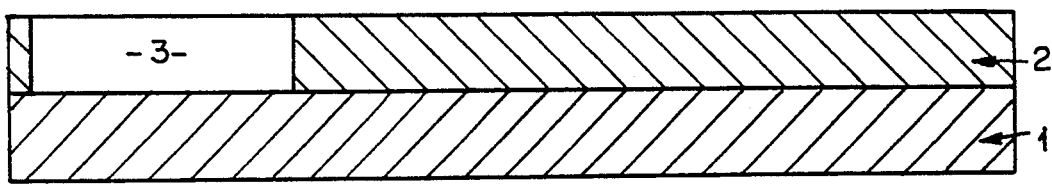
Figure 1C:
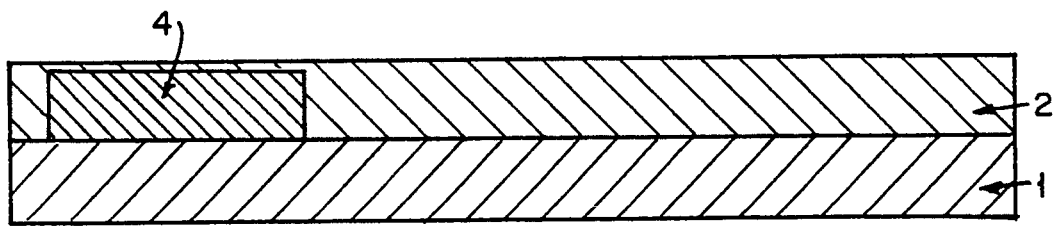
Figure 1D:
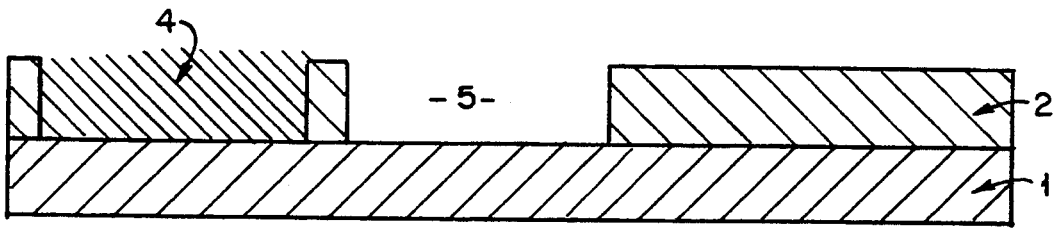
Figure 1E:
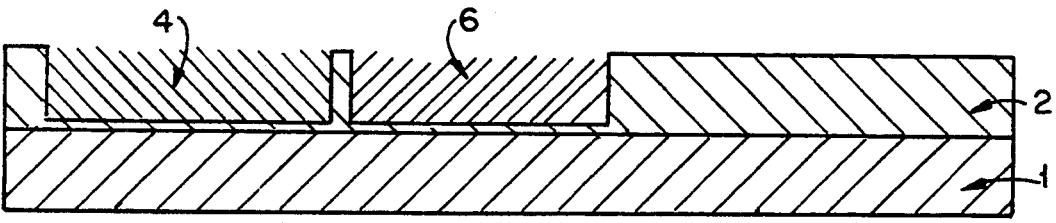
Figure 1F:
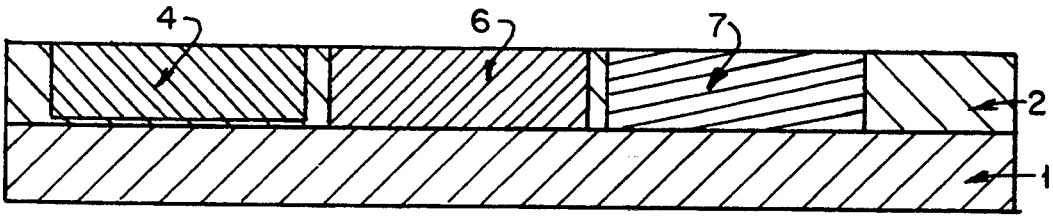

Referring to FIG. 1A, the first step in this process is to coat and cure a black filter material 2 onto a glass or transparent substrate 1. The black colored filter material which has been used is DARC 100, however, a variety of other black colored filter materials are available. The thickness of the coat can range from 0.5 to 10 $\mu$m. A particularly preferred thickness is 2 $\mu$m. This creates a matrix which surrounds the RGB color pixels. The matrix can improve the RGB color properties previously attainable because it will prevent RGB colors from mixing. The desired thickness depends on materials and display requirements. It should be noted that the thickness of the coating can be controlled by the coating method used. The thickness of the substrate preferably range from 0.1 to 2 mm. A particularly preferred thickness is 1 mm because it is the most common thickness for the glass substrate for a LCD.

The particular laser ablation system being used and the speed at which the filters are processed may vary. The substrate size can range from 0.1 to 30 inches square. The preferred substrate size is 8 to 12 inches, but this will vary tremendously depending on the laser ablation system utilized and the type of device being manufactured.

Curing can be accomplished by baking the coated substrate in a convection oven preferably for 1 hour at 230° C. However, the baking temperature and time will vary depending upon the type of colored filter material. It should be noted that a variety of curing methods may be employed including but not limited to, hot plates, infrared ovens and other rapid thermal processes.

The initially coated and cured substrate is a black, light shielding filter which can function as a mask to improve the quality of the light transmitted by filtering a broad range of wavelengths.

After the substrate is initially coated with the black, light-shielding mask, the next step is to ablate an area of the substrate by use of a laser, FIG. 1B - 3. The region targeted for ablation may be for example a square ranging in size from 1 $\mu$m square to larger than 1 cm square. The area being ablated depends on the system used, the coating method, speed of the system and number of colors in the array. In a preferred embodiment, the square ablated, ranges from 15–75 $\mu$m by 15–75 $\mu$m.

Laser ablation has been accomplished with XMR's Micromachiner Model 1100 or Model 5100. However, other types of industrial laser ablation systems are available. An example of such a machine is the XMR Model 5100, which can handle 15–120 color filters per hour depending on the laser beam size used. It may be possible to ablate a single area or a pattern at one time. The model 1100 uses an excited XeCl gas as a laser medium to produce ultraviolet light at 308 nanometers. This laser system is able to deliver to the work-piece a beam with fluence from 1 to 20 joules/cm$^2$ with repetition rates from 1 to 100 Hz. The spot size is rectangular; adjustable in one $\mu$m increments from 5 to 85 $\mu$m in both the X and Y axis. The system is computer controlled, a menu driven X-Y stage allows sample positioning in a 10×10 cm field with an accuracy of 0.5 $\mu$m. The Model 5100 production line proven XeCl excimer laser generates over 600 mJ of pulse energy at a wavelength of 308 nm at pulse rates from 1 to 300 Hz. It is specified to operate at 185 watts of average power (500 mJ at 300 Hz) for extended periods of time (9 million pulses) between window cleaning intervals, and 185 watts for shorter periods. The patterning of color filter material using excimer laser ablation must be accomplished with a high throughput on exposed areas without dye sublimation and dye degradation which could result in an attendant loss in color intensity, filter contrast, and color purity on the unexposed area. The energy density or fluence (joules/cm$^2$) and the number of pulses by the laser are important factors in the rate of etching a region of the coated substrate. Presently, fluences from 6 J/cm$^2$ to 93 mJ/cm$^2$ have been evaluated. The number of laser pulses range from one to ten. As mentioned above it is important to complete the patterning quickly to avoid loss in the color intensity, filter contrast, and color purity. The size of the area being ablated also impacts the speed of the etching. When larger areas are ablated (up to 1 cm×1 cm) it will be necessary to remove the ejected fragments from the filter array. This can be accomplished by a vacuum system or purging with inert gas to remove said fragments. However, the use of alcohol or other solvents to rub clean the debris also works acceptably. In the preferred embodiment at a fluence of 0.2 J/cm², a region of 50 μm by 50 μm required 6 pulses to be cleared. However these factors will vary depending on the laser system used, color filter materials, thickness and the processing rate desired.

Rather than adjusting the laser's beam size, a mask with ultraviolet transparent regions can be used. The laser's energy then passes through the transparent regions and strikes the workpiece at predetermined locations.

When laser ablation is complete, the next step is to place a colored filter material into the ablated regions, see FIG. 1C - 4. This can be accomplished by use of a 'spin coating' method. However a variety of other methods exist to insert the colored filter material onto the substrate. These include various roller methods, meniscus coating, printing plate or extrusion coating. Table 1 provide a comparative analysis of the various coating approaches.

TABLE 1

| Method | Uniformity | Amount of material to Coat 1 Square Inch, mL | Comments |
| --- | --- | --- | --- |
| Spinning | ±2% | 0.20 | Very uniform except for corners of plate. Well characterized from semiconductor industry. Best for circular substrates. |
| Roller | ±5-10% | 0.03 | Thickness uniformity may not be good enough for advanced displays. Solvent evaporation is a problem in long runs. |
| Spray | >±10% | 0.04 | Used for coating photoresist where uniformity can be sacrificed for throughput. |
| Meniscus | <±5% | 0.01 | Uniformity problems occur at edge of glass. Solvent evaporation is a problem in long runs. |
| Patch | ±10% | 0.006 | Poor uniformity. High equipment cost. |
| Screen printing | | 0.006 | Poor uniformity. across pixel. Not compatible with thin films. Low cost. |
| Offset printing | | 0.006 | Poor uniformity across pixel. Poor film quality with thin film. Very low cost. |

The color which is placed can be any of the primary colors, red, blue or green. Also possible are cyan, yellow, or magenta. Colored filter materials used include PiC Blue 02, PiC Green 02, PiC Green 103, and PiC Red 02. Other color filter material include: a variety of PiC color filters, pigmented acrylate, pigmented polyimide, UV curable inks, dyed or pigmented benzocycolobetuene, or dyed polyimide (reformulated). Polyimide dyes are preferred in this embodiment because they have a higher optical absorption coefficient at the 308 nm wavelength. A variety of other materials have been tested at different wavelengths. A chart of their optical absorption coefficients are shown in Table 2.

TABLE 2

Optical Absorption Coefficient of Various Polymers

| POLYMER | WAVELENGTH | | | |
| --- | --- | --- | --- | --- |
| | 193 nm | 248 nm | 308 nm | 351 nm |
| Polyimide | $4.2 \times 10^5$ | $2.8 \times 10^5$ | $1.2 \times 10^5$ | $2.6 \times 10^4$ |
| Polysulfone | $4.0 \times 10^5$ | $1.5 \times 10^5$ | $8.1 \times 10^2$ | $\sim 10^1$ |
| Polycarbonate | $5.5 \times 10^5$ | $1.0 \times 10^4$ | $<10^1$ | $4.0 \times 10^0$ |
| Poly(α-methyl)styrene | $8.0 \times 10^5$ | $6.5 \times 10^3$ | $<10^1$ | $\sim 10^1$ |
| Poly(methymethacrylate) | $2.0 \times 10^3$ | $6.5 \times 10^2$ | $<10^1$ | $<10^1$ |
| Poly(vinylacetate) | $1.0 \times 10^3$ | $<10^2$ | $<10^1$ | $<10^1$ |
| Polyethylene | $6.3 \times 10^2$ | $<10^1$ | $<10^1$ | $<10^1$ |
| Polypropylene | $5.3 \times 10^2$ | $<10^1$ | $<10^1$ | $<10$ |
| Polytetrafluoroethylene | $2.6 \times 10^2$ | $1.4 \times 10^1$ | $<10^1$ | $<10^1$ |

After placing the colored filter material into the ablated area, the filter array is again baked to cure the added colored filter material. The baking methods are similar to those used in curing the black, light-shielding filter.

Another area is then ablated, FIG. 1D - 5 and filled with a different colored filter material, FIG. 1E - 6. This colored filter material is also cured by baking. The process continues until all the colors required in the array have been added, FIG. 1F.

As described previously, it is possible to develop a patterned array by ablating a single region at a time or by ablating a pattern which is then filled with a single colored filter material. After the regions were cured, the next pattern of holes could be created. These also would be filled with a different colored filter material. This process continue until all of the colors desired in the array have been added.

Laser ablation can also be used to 'level' or planarize the color array after all the color elements have been added. Depending on the coating methods used to deposit the color filter materials, it may be necessary to use the laser ablation technique to reduce the coating thickness and thus limit the degree of light absorbance. In certain instances a protective polymer coating also may be added. Preferably the completed array has a coating thickness of 0.5 to 10 μm. In the preferred embodiment, is thickness was 1-2 μm.

It should be mentioned that besides the four color filter array (red, blue, green with a black matrix), a three, two, or single color array is possible. For a such arrays, no black colored filter material would be applied to the substrate. With three or two colors, after the first colored filter material is applied and cured, an area would be ablated. The remaining colored filter material would be inserted and cured. A single color array would be applied to the substrate and laser ablation would be used to reduce the thickness if necessary.

The following examples are illustrative of the process and products of the present invention, but are not to be construed as limiting.

EXAMPLE 1

To develop a four color filter array (RGB and a black matrix) first requires a glass substrate which is as large as 20 inches and 1.0 mm thick. A black polyimide colored dye, PiC Darc 100, is then spin coated onto the surface of the substrate. An adhesive promoter such as organic silane (Brewer Science APX) is optional for better adhesion between the color filter and glass substrate. This will form a coating of approximately 1 to 3

μm in thickness. The substrate is then cured for one hour in a convection oven at a temperature of 230° C. After curing a series of pixel regions are created by the laser ablation. The XMR 5100 will create regions approximately 15×15 μm's. After the pixels are created, a blue colored polyimide dye, PiC 02 Blue, is spin coated onto the substrate. This blue film is cured using the previously discussed technique. Laser ablation, spin coating, and curing continues until the remaining dyed polyimides are added - PiC Red 02 and PiC Green 02. After all the colors are cured, a planarization layer is applied on top of all of the colors and laser ablation is again used to 'planarize' the color filter array. In this step, the laser ablates a large region so as to decrease the ultimate thickness of the coating on the entire filter to 1.5 μm. The XMR 5100 laser can ablate a 1 cm×1 cm or larger region at a time.

EXAMPLE 2

Another example involves the use of conventional printing techniques to coat the substrate for a three color array. A variety of methods can be used to coat the color materials including thermal printing, ink-jet printing and electrophotography methods.

Similar to the earlier example, a glass substrate is required. The substrate is then coated with a blue resin, PiC Blue 02 by using the printing plate process. The coating is approximately 3.5 to 5 μm thick. The coating is then cured by baking in a convection oven at 230° C. for one hour. The red and green colored polyimide dyes, PiC Red 02 and PiC Green 02, are each added and cured respectively. After all the colors are added and cured, laser ablation is used to reduce the thickness of the coating to 1.5 μm. The XMR 5100 is capable of ablating regions approximately 1 cm×1 cm. This will facilitate fast throughput.

EXAMPLE 3

To develop a three color array (RGB) is a procedure similar to example 1.

A glass substrate is required and is approximately 20 inches in size and 1.0 mm in thickness. Green colored polyimide dye (PiC Green 02) is spin coated onto the substrate. The colors can be patterned in a variety of methods. These typically include mosaic, triangle, and striped patterns. The thickness of the coating is approximately 2 μm thick. The coating is then cured by baking in a convection oven for one hour at 230° C. Laser ablation is then accomplished using the XMR 5100. Regions of the previous coating are removed. The next coatings (PiC Blue 02 and PiC Red 02) are then, respectively spin coated onto the substrate, cured and ablated by laser. After all the colors are added, the entire substrate can be 'planarized' or leveled off to a consistent thickness.

EXAMPLE 4

An additional technique that can be used to create a four color array is the use of printing plates. While this technique is similar to example 3, some significant advantages exist with this method. By referring to FIGS. 2A–2H, it is possible to observe the steps involved in this process.

Figure 2A:
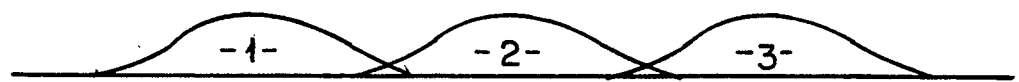
FIGS. 2A–2H are sectional views showing a collection of steps in manufacturing a four color filter array by which the colors have been placed on the substrate by printing color filter plates.
Figure 2B:
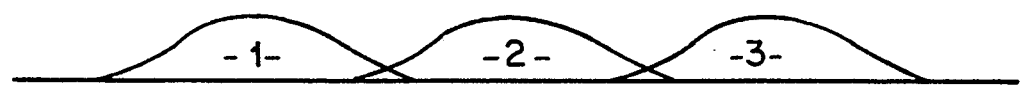
Figure 2C:
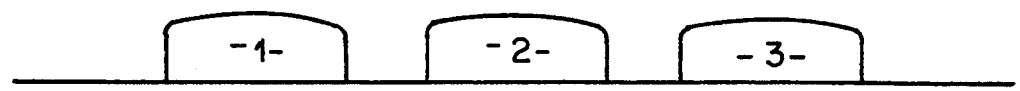
Figure 2D:
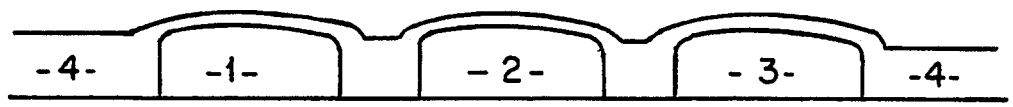

FIG. 2A demonstrates the major advantage of this procedure over the previous methods. In FIG. 2A, all of the colored filter material may be added in one step by use of printing plates. Thus the blue, green and red ( FIG. 2A - 1, 2 and 3, respectively) are placed onto the substrate in a single step. FIG. 2B shows the colors being curing either by a rapid thermal process or laser curing. Previously it was necessary to add each colored filter material and then cure. With this approach it is possible to add all colored filter materials and then cure.

Figure 2E:
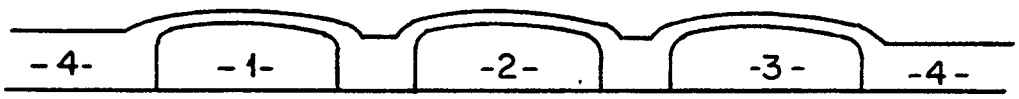
Figure 2F:
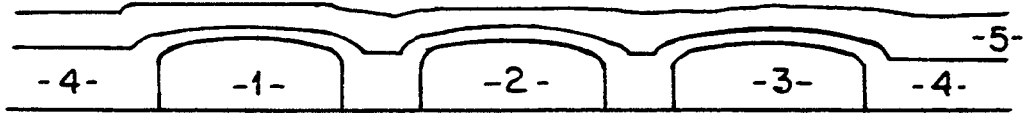
Figure 2G:
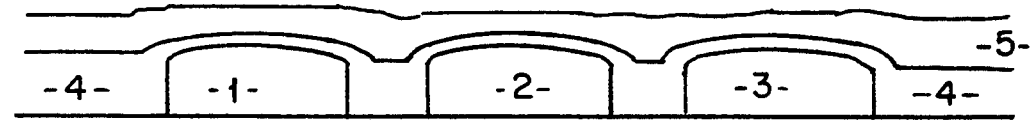
Figure 2H:
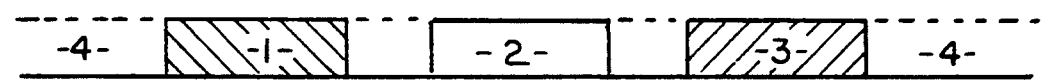

When curing is completed, the array is then coated with a black, light-absorbing matrix. Such a colored filter material may be DARC 100, however a variety of other black colored filter materials are available (FIG. 2D - 4). The black colored filter material is cured by a variety of rapid thermal process or laser curing (FIG. 2E). After the black colored filter material is cured, the substrate is coated with a clear polymer (FIG. 2F - 5), this coating is then cured (FIG. 2G) by rapid thermal process or laser curing. The last step involves the reduction of thickness by laser ablation or plasma etching (FIG. 2H). While this example created a four color filter array, other combinations are clearly possible.

EXAMPLE 5

Figure 3A:
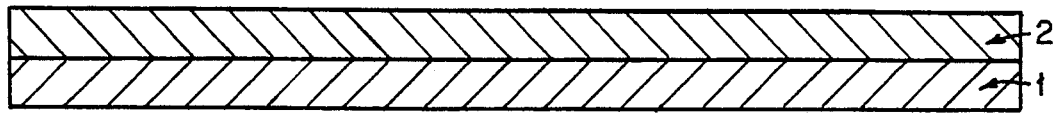
FIGS. 3A–3F are sectional views of a collection of steps showing the use of laser ablation in conjunction with a release layer for fabrication of a color filter array.
Figure 3B:
Figure 3C:
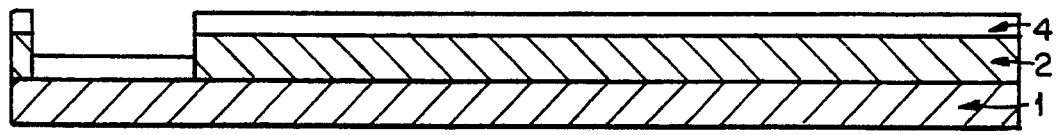
Figure 3D:
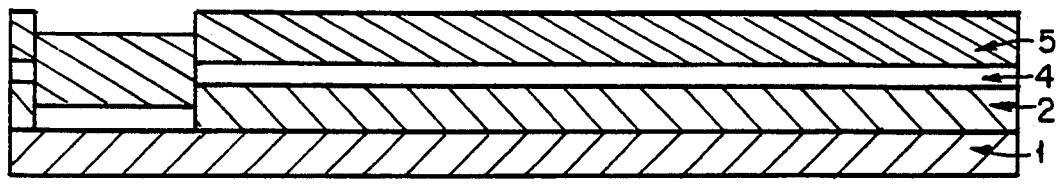
Figure 3E:
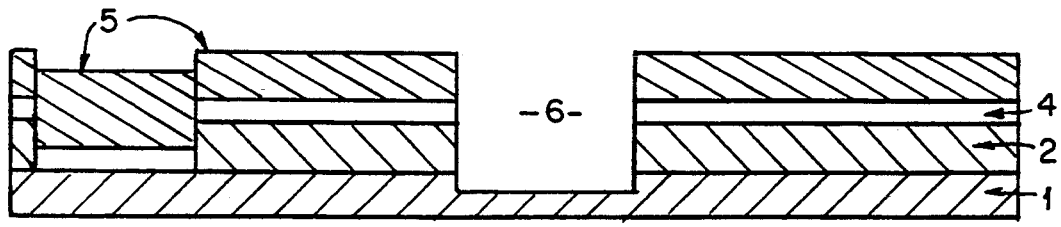
Figure 3F:
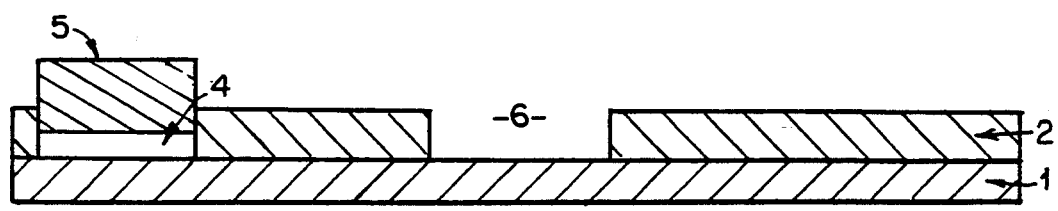

Another approach involves the use of laser ablation in conjunction with a release layer to manufacture a color array. While this example involves the manufacture of a four color filter array, it is possible to create three, two and single color filter arrays by this approach. FIGS. 3A–3F outline the steps in this example. The first step involves the coating of a substrate (FIG. 3A - 1) with a black, light-absorbing color filter material (FIG. 3A - 2). This colored filter material is then cured by a rapid thermal process or laser curing. Next a portion of the black, colored filter material is then removed by laser ablation (FIG. 3B - 3). Actually a single area may be removed or a pattern may be created using laser ablation. After the black, colored filter material is removed, the array is coated with a release layer (FIG. 3C - 4). This release layer material can consist of Brewer Science's PIRL. After coating, the release layer is cured by using one of the techniques discussed previously. Then the release layer coated with a colored filter material (FIG. 3D - 5). An example of the colored filter material is a blue colored polyimide dye (PiC Blue 2), however a variety of materials are available. This coating is then cured. Laser ablation is again used to create another pixel region (FIG. 3E - 6). The release layer is then developed and washed. This will remove the excess colored filter material, except for the material which is located in the ablated area (FIG. 3F).

The steps of coating the substrate with a color filter material, curing, coating with a release layer, curing, ablation, development and washing of the release layer continues until the desired pattern is achieved on the substrate. Finally the thickness of the entire array is reduced by either laser ablation or plasma etching.

What is claimed is:

1. A method of patterning a color filter array which comprises:
   a. coating a substrate with a color filter material;
   b. curing the colored filter material on the substrate;
   c. removing one or more regions of colored filter material on the substrate by laser ablation;
   d. depositing a colored filter material into the laser ablated region;
   e. curing the colored filter material which has been added into the laser ablated region;
   f. leveling the entire color array by either laser ablation or plasma etching; and
   thereby creating a color filter array containing one or more colors for use in a liquid crystal display.

2. The method of claim 1 wherein the substrate is glass or mylar, up to 30×30 inches and a range of thickness of approximately 0.5 to 4 mm.

3. The method of claim 1 wherein the color filter material is applied by roller coating, meniscus coating, squeeging, spin coating, extrusion coating, ink jet printing, off-set printing, screen printing, flexographic printing, graphic printing, thermal transfer printing, electro-deposition, or vacuum deposition methods and has a range of thickness of 0.5 to 10 $\mu$m.

4. The method in claim 1 wherein curing of the colored filtered material is achieved by rapid thermal processing.

5. The method in claim 1 wherein curing of the color filter material is achieved by baking by oven, hot plate, microwave, electron beam, or infrared oven.

6. The method of claim 5 wherein the curing of the colored filter material is accomplished by baking the coated substrate in a convection oven for 1 hour at 230° C.

7. The method in claim 1 wherein curing of the colored filter material is at a temperature within a range of 100° to 300° C.

8. The method of claim 1 wherein the laser ablation is accomplished by a ultraviolet excimer laser at a fluence in a range of 6 J/cm$^2$ to 10 mJ/cm$^2$ and a range of 1 to 50 laser pulses.

9. The method of claim 1 wherein the colored filter material consists of dyed polyimide, pigmented acrylate, pigmented polyimide, UV curable inks, dyed or pigmented benzocycolobetuene.

10. The method of claim 1 wherein the size and shape of the laser beam used in laser ablation is controlled by a mask with one or more ultraviolet transparent regions.

11. The method of claim 10 wherein the such adhesive promoters include organic silane, or other commercially available silane promoters.

12. The method of claim 1 wherein the substrate is coated with an adhesive promoter prior to any colored filter materials are placed on to the substrate surface.

13. The method of claim 1 wherein the colored filtered material does not exceed a range of 1 to 5 $\mu$m.

* * * * *